E. W. LAWRENCE
SELF OILING PULLEY.
APPLICATION FILED DEC. 31, 1919.

1,354,768.

Patented Oct. 5, 1920.

Inventor:-
Edgar William Lawrence
By his Attorneys
Baldwin Wight

UNITED STATES PATENT OFFICE.

EDGAR WILLIAM LAWRENCE, OF BATH, ENGLAND.

SELF-OILING PULLEY.

1,354,768.     Specification of Letters Patent.     Patented Oct. 5, 1920.

Application filed December 31, 1919. Serial No. 348,591.

*To all whom it may concern:*

Be it known that I, EDGAR WILLIAM LAWRENCE, a subject of the King of Great Britain, residing at Newark Works, Bath, England, have invented new and useful Improvements in Self-Oiling Pulleys, of which the following is a specification.

This invention relates to improvements in self-oiling pulleys having an oil reservoir and provided with means for supplying oil to the pulley bearing.

According to this invention I construct a pulley of pressed metal plates which are riveted or welded together and secured to a central hub, thus forming an oil reservoir, and I provide means for supplying oil consisting of a wire, tape or tube, leading from the outer periphery of the pulley and passing through holes in the pulley hub to supply oil to a cavity in it and then to a bearing on which the pulley is mounted.

Figure 1:
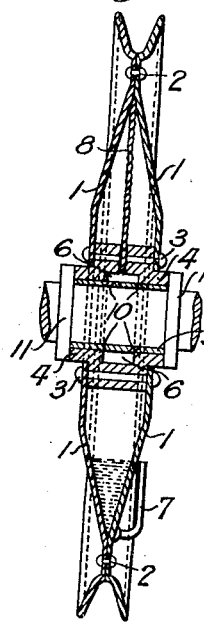
Figure 2:
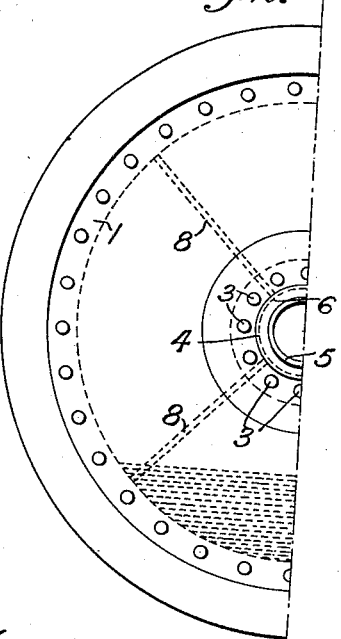
Figure 3:
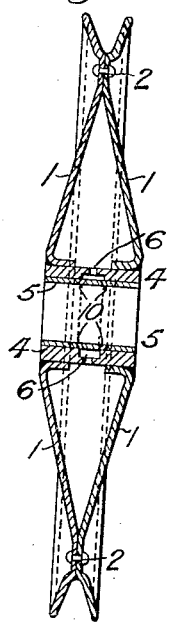
Figure 5:
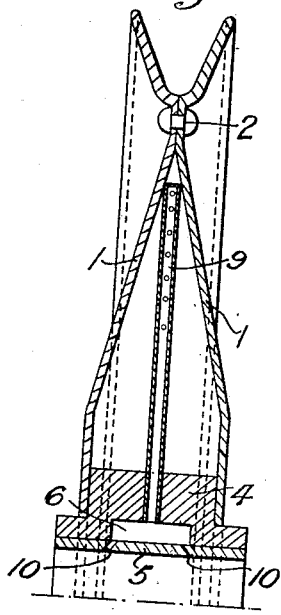
Figure 4:
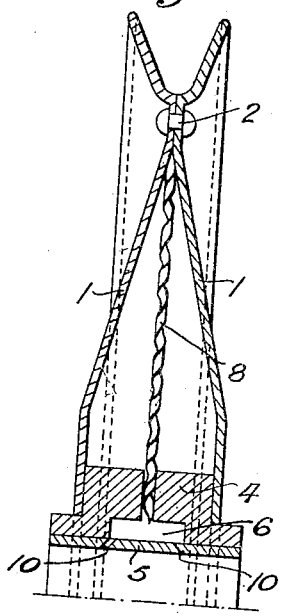

In the accompanying drawings which illustrate the invention Figure 1 is a section of a pulley, Fig. 2 a half elevation at right angles thereto, Fig. 3 a section of another construction of pulley, Fig. 4 a half section to a larger scale of the pulley shown in Fig. 1, and Fig. 5 a half section of a modification.

1 are pressed metal plates forming the pulley and riveted together near their periphery at 2. In Figs. 1 and 2 the plates 1 are riveted at 3 to a central hub 4. In Fig. 3 the plates 1 are secured to the central hub 4 by welding.

The hub 4 is provided with a bush 5 and has a cavity 6. 7 is a tube for introducing oil into the pulley 1 (see Fig. 1); the oil is supplied to the cavity 6 by means of twisted metallic tapes 8, passing through the hub 4 (see Figs. 1, 2 and 5) or by perforated tubes 9 (see Fig. 5) and passes from the cavity 6 to a bearing 11, through holes 10 in the bush 5.

The selection of the particular means employed to supply oil to the pulley bearing depends on circumstances such as the amount of oil required to lubricate the bearing, the viscosity of the oil, speed of the pulley and the like. For instance, if it is found that the twisted metallic tape or perforated tube, which are given as examples, convey too much oil, a straight wire of circular or other convenient section, or other means, may be employed.

What I claim is:—

1. A pulley having a central hub, a bearing for the hub, metal plates secured to each other and to the hub forming an oil reservoir, a cavity in the hub, a bush between the hub and the bearing, perforations in the bush and means for conveying oil from the periphery of the pulley to the cavity.

2. A pulley having a central hub, a bearing for the hub, metal plates secured to each other and to the hub forming an oil reservoir, a cavity in the hub and a twisted wire adapted to convey oil from the periphery of the pulley to the cavity.

3. A pulley having a central hub, a bearing for the hub, metal plates secured to each other and to the hub forming an oil reservoir, a cavity in the hub, a bush between the hub and the bearing, perforations in the bush and a twisted wire adapted to convey oil from the periphery of the pulley to the cavity.

In testimony that I claim the foregoing as my invention, I have signed my name this 9th day of December, A. D. 1919.

EDGAR WILLIAM LAWRENCE.